Oct. 22, 1968  G. A. HANLON ET AL  3,406,514
COMMUNICATION CABLE QUAD AND METHOD OF MAKING SAME
Original Filed Jan. 27, 1966
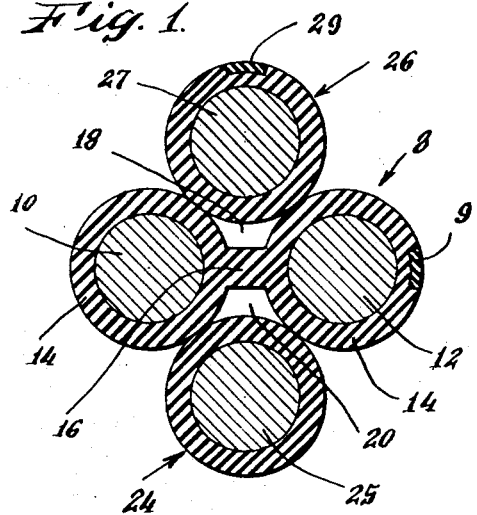
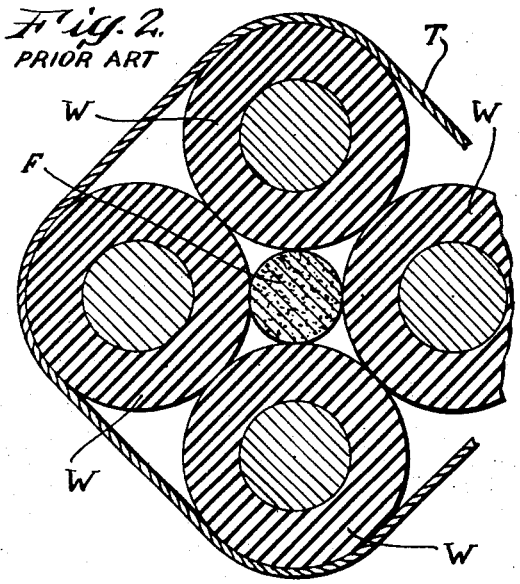
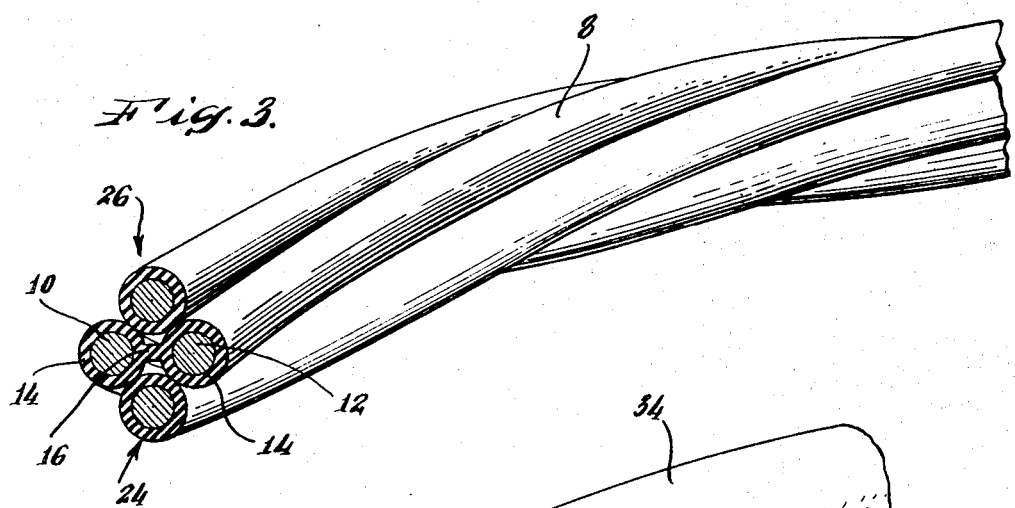
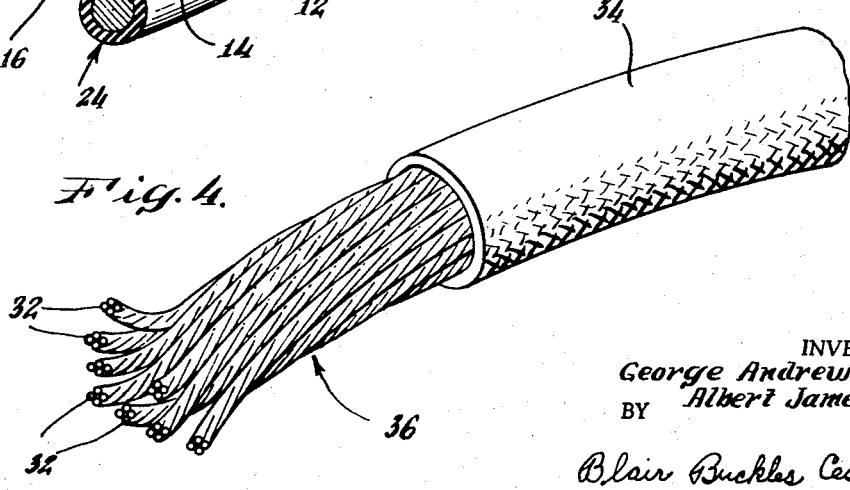
INVENTORS.
George Andrew Hanlon
Albert James Garde
BY
Blair Buckles Cesari + St.Onge
ATTORNEYS.

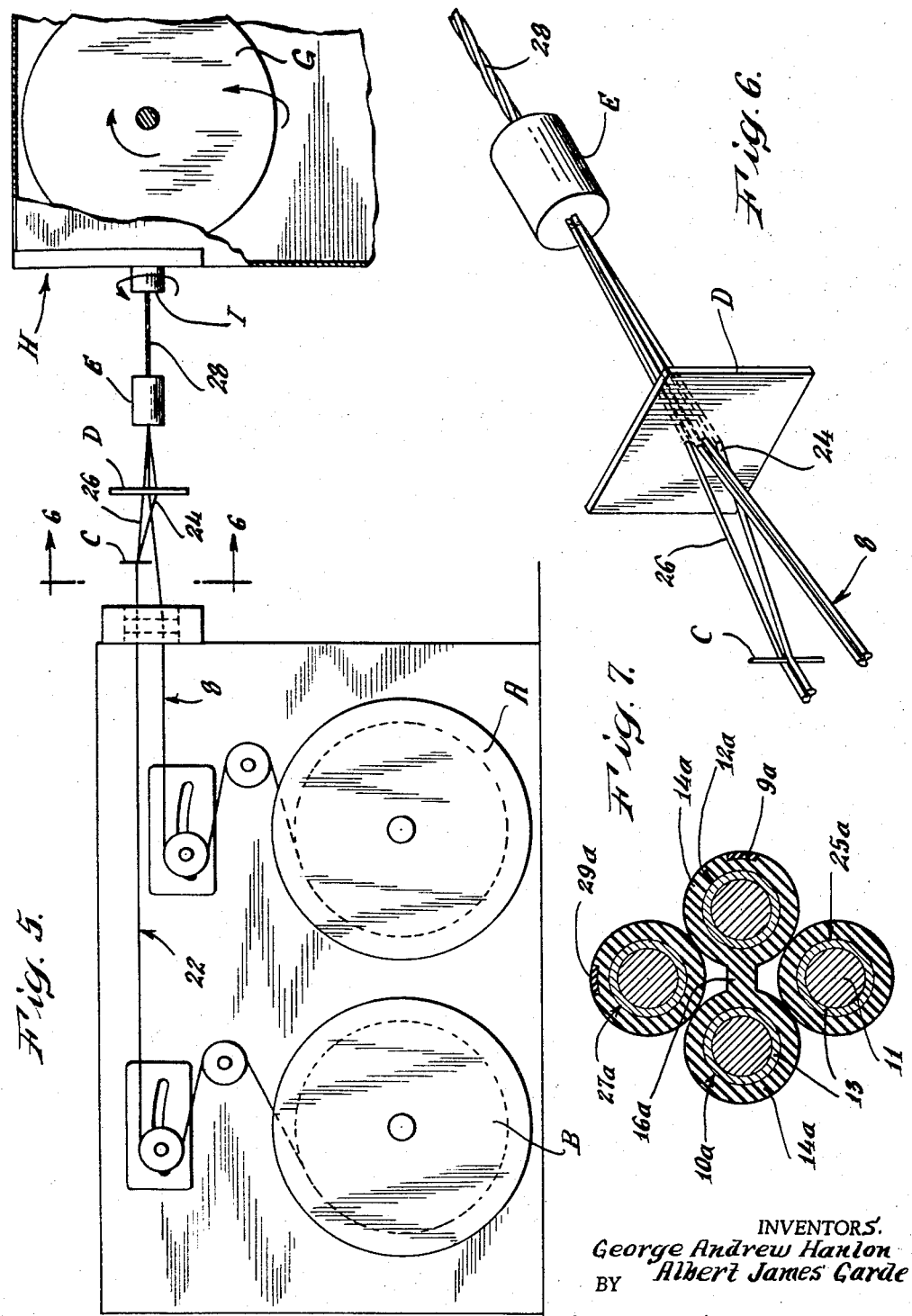

United States Patent Office 3,406,514
Patented Oct. 22, 1968

3,406,514
COMMUNICATION CABLE QUAD AND METHOD OF MAKING SAME
George Andrew Hanlon, Branford, and Albert James Garde, Milford, Conn., assignors to The Whitney Blake Company, New Haven, Conn.
Original application Jan. 27, 1966, Ser. No. 523,320, now Patent No. 3,364,305, dated Jan. 16, 1968. Divided and this application July 18, 1967, Ser. No. 654,156
7 Claims. (Cl. 57—156)

ABSTRACT OF THE DISCLOSURE

Disclosed herein is a quad cable construction made from two joined wire pairs by slitting the web joining one wire pair and then nesting the separate wires thus formed in juxtaposition to one another along and across the web of the other joined wire pair. The quad cable construction is held intact by twisting thereof to entwine the one joined wire pair with the two separate wires.

Quad cable thus formed exhibits minimal resistance unbalance since the lengths of the pair wires cannot vary and drawdown is minimized due to the joined condition of the pair wires during processing.

Cross-reference to related application

This is a division of application Ser. No. 523,320, filed Jan. 27, 1966, now U.S. Patent No. 3,364,305.

Background of the invention

The type of cable used to link communication equipment in the field presents the cable industry with a difficult combination of problems. Such cable must often be transported over long distances and then strung out over rugged terrain. As a result, purchasers require the cable to be lightweight and flexible. In addition, the cable must be built to withstand extended exposure to the elements as well as rough handling, while maintaining its ability to clearly transmit communications.

Under some circumstances, it may be impossible or undesirable to reclaim field communication cable when its usefulness has ended. Therefore, the cable must be expendable when necessary, and cost becomes an important factor in determining suitability. However, even though expendable, the cable must retain acceptable communication transmission characteristics.

The diverse requirements for a cable of the type in question necessitates that a balance be struck between cost and quality, and there is, therefore, a constant search in the industry for new cable constructions and methods whereby the balance can be shifted in favor of greater quality at lower cost.

A prior art configuration for field communication cable, known as a star quad, is shown in FIGURE 2. It comprises four separate insulated conductors W (wires) wrapped about a central fiber filler F, all bound together by thread T. Prior art quad cable thus requires four separate wires, a filler and exterior binding. A quad cable made up of fewer separate components would simplify assembly apparatus requirements and lower cable cost to a considerable extent. It would be particularly desirable to eliminate the separate spacing filler F if the interaxial spacing of the wires for a predetermined mutual pair capacitance could be provided in the cable construction. Thus, the wires of the quad cable must be spaced apart a predetermined distance for the proper mutual capacitance of each pair. Further, the interaxial spacing of the pairs must be maintained within limits during use of the cable to maintain the required mutual capacitance. If the mutual capacitance of the cable can be maintained without a central filler, the weight and cost of the quad cable can be reduced.

The wires of the prior art cable are all separate and will easily separate when the cable is flexed or subjected to axial compression, notwithstanding the fact that the wires are twisted about the central filler. The cable must be bound, therefore, with bindings of thread or similar material to maintain the mutual capacitance between pairs in the quad, adding to manufacturing cost and cable weight, while decreasing cable flexibility.

As is well known to those skilled in the art, the electrical resistance values of the various wires forming a communication cable should be as closely matched as possible. Differences in resistance between wires in a cable results in resistance unbalance, which is detrimental to good quality transmission. However, the maintenance of desired resistance values during manufacture of a star quad of the type shown in FIGURE 2 is difficult. As the separate wires W are twisted about the filler F, some of the wires are twisted more tightly or more loosely than the others, and thus over appreciable lengths of cable, the lengths of the individual wires forming it may vary considerably. Since the resistance value of a conductor is in part determined by its length, the resistance value of the several wires will vary accordingly. In addition, the individual wires W are subjected to axial tension during wire insulation or cable manufacturing operations, and the conductors therein may yield locally. Local yielding or "drawdown" reduces the cross sectional area of the wire and, as is well known, increases resistance. Since the "drawdown" occurring in the individual wires may vary, their resistance value will also vary. Thus, because of the two phenomena discussed above, resistance unbalance has been a problem in the prior art cable.

Accordingly, it is an object of the present invention to provide a communication cable having a minimal number of component parts.

A further object of the present invention is to provide a cable of the above character which is lightweight and relatively inexpensive to manufacture.

Another object of the present invention is to provide a cable of the above character having a low degree of resistance unbalance of the conductors.

A further object of the invention is to provide a cable configuration of the above character wherein mutual capacitance between conductor pairs is maintained more closely constant from pair to pair.

Another object of the invention is to provide a cable of the above character wherein there are two pairs of wires to form a quad, one of the wire pairs being joined together by a web of insulation.

A further object of the present invention is to provide a cable of the above character which remains intact without need for a separate binder.

Another object of the present invention is to provide a jacketed communication cable having a core composed of a plurality of cable configurations of the above character.

Another object of the invention is to provide a method for making a cable configuration of the above character.

A further object of the present invention is to provide a method of the above character which is simple and low in cost, and which does not require complex apparatus.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

Summary of the invention

In general, FIGURES 1 and 3 illustrate the quad cable of the present invention. As best seen in FIGURE 1, the quad is formed of two pairs of wires, a pair 8 joined by insulation web 16 with a nested pair of wires 24 and 26 to form a quad. The web 16 maintains the wires of pair 8 apart to provide the proper interaxial spacing for the conductors 10 and 12, as well as to maintain the proper interaxial spacing of the conductors 25 and 27 as the wires nest substantially tangent to the wires of the adjacent pair. The pair 8 being spaced and held together by web 16 thus determines the positioning of wire pair 24, 26 with respect to each other and with respect to the joined pair 8.

As shown in FIGURE 2, the prior art quad cable requires a binder thread T and filter F to space the wires apart and to maintain the proper interaxial conductor spacing. Without the filler F the interaxial conductor spacing of opposing pairs would be varied and variable as the wires of one conductor pair are positioned closer or further away from each other during the twisting step in cable manufacture or in use in the field.

As shown in FIGURE 3, the quad cable of our invention, when twisted, provides a natural interlocking of the two pairs since the wires 24, 26 tend to nest about the joined pair 8 for disposition across the web 16 of the joined pair. This interlocking nesting relationship of the two pairs makes it unnecessary to apply exterior binding or retaining wrap around the quad for a number of communication applications.

As shown in FIGURE 4, a plurality of quads 32 of our invention may be bundled and twisted together to form a communication cable core 36 having a protective jacket 34. In such application the nesting of the separated wires about the joined pair tends to maintain the quad in its twisted configuration for handling and cabling into a larger multi-pair communication cable.

Brief description of the drawings

For a fuller understanding of the nature and objects of the invention, reference should be had to the following detailed description taken in connection with the accompanying drawings in which:

FIGURE 1 is a cross-sectional view of a two pair or "quad" cable made in accordance with the present invention.

FIGURE 2 is a cross-sectional view of a prior art quad cable.

FIGURE 3 is a perspective view, partly in section, of the cable illustrated in FIGURE 1, after being twisted about its longitudinal axis.

FIGURE 4 is a perspective view of a jacketed communication cable with the jacket partly stripped back to reveal a core composed of a plurality of cable quads in accordance with the present invention.

FIGURE 5 is a schematic side elevation view of the apparatus used in forming and twisting "quad" cable.

FIGURE 6 is a fragmentary perspective view taken along the line 6—6 of FIGURE 5.

FIGURE 7 is a cross-sectional view of an alternate embodiment of a quad cable in accordance with the invention and having composite conductors.

Similar reference characters refer to similar parts throughout the several views of the drawings.

Description of the preferred embodiments

The quad cable of our invention is particularly suitable for field communication use and is preferably formed from two joined wire pairs, and its structure can be further described in conjunction with a description of the method of its manufacture (FIGURE 5).

Specifically, a first joined wire pair 8 is continuously fed from a supply source, shown in FIGURE 5 as reel A. Wire pair 8 is formed of two electrical conductors 10 and 12 (FIGURES 1 and 3) each covered by a layer of primary electrical insulating material 14. The layers of electrical insulating material 14 are connected by an integral web 16, and as a result, axially extending grooves 18 and 20 are formed in the upper and lower surface respectively of the joined wire pair 8.

As shown in FIGURES 5 and 6, a second joined wire pair 22 is fed from a second supply source reel B, over a slitting member C such as a taut piano wire, where the wire pair 22 is separated at the web into two individual wires 24 and 26. After being separated, wires 24 and 26 and joined wire pair 8 are fed through lay plate D (FIGURE 6) and brought together by fixed die E so that wire 24 nests in groove 20 and wire 26 nests in groove 18 as shown in FIGURE 1. A twisting capstan I grips the "quad" wire assembly 28 and imparts a twist thereto to keep it intact as it emerges from fixed die E. At this point the "quad" wire assembly 28 has the configuration shown in FIGURE 3 where wires 24 and 26 are nested and interlocked about web 16. A take-up reel G is positioned inside twisting assembly H and rotates in the direction of the arrow thereon to collect the twisted quad 28. Simultaneously, take-up reel G revolves about an axis generally parallel to the longitudinal axis of quad 28 to complement the twisting motion of capstan I and to prevent unwinding of quad 28.

A number of advantages are obtained over prior art cable and cable fabrication methods by means of the present invention. Prior art quad cable as illustrated in FIGURE 2, requires the making, handling and twisting of five component parts while our quad cable may be formed from two joined wire pairs, each of which is handled as a single component during cable manufacture. This reduction of components from five to two enables the assembly apparatus to be simplified, reducing manufacturing cost. In addition, the filler F of the prior art configuration is eliminated and replaced with a relatively thin web 16 in the present invention reducing cable weight and cost. As is seen in a comparison of FIGURE 1 with FIGURE 2, web 16 does not require the cross-sectional area required of filler F which must contact each of the four wires of the prior art configuration to maintain them at the required separation.

A quad cable of the invention as shown in FIGURES 1 and 3 tends to remain together even without an exterior binding of thread or tape. Further, axial compression is resisted by the quad of the invention because of the web 16 joining the pair 8, thus keeping the quad together. The joined wire pair 8 cannot separate in the cable, and as can be seen in FIGURE 3, joined pair 8 is continuously wrapped about and nests with the separated wires 24 and 26 when the assembly is twisted about its longitudinal axis. This nesting feature of the present invention keeps the cable intact for use in a field communication cable, and the length of "lay," that is the length of wire forming a 360° twist, should preferably be maintained between about 2 inches and about 10 inches for this purpose. Elimination of the binder further reduces manufacturing cost and cable weight. In addition, a binder tends to restrain movement and bending in the cable, and its elimination results in a more flexible quad cable.

The use of joined wire pairs in the present invention minimizes the resistance unbalance resulting from twisting, and "drawdown" of the conductors. Wire pair 8 (FIGURE 3) remains joined by web 16 throughout the twisting process which occurs when the assembly is twisted about its longitudinal axis in twister G (FIGURE 5). The lengths of the wires forming wire pair 8 obviously cannot differ in the completed assembly and therefore their resistance values remain balanced. Wire pair 22 (FIGURE 5) remains joined until fed over the slitting member C, and twisting occurs directly thereafter at die E. The short distance between slitting member C and die E does not allow for any significant differences in length between wires 24 and 26, and resistance values remain balanced in this pair as well. In addition, any axial tension produced during manufacture is distributed uniformly between joined wires of a pair, and if some elongation should occur, both conductors of the pair will yield to the same degree because of their joined condition. Thus, resistance unbalance in a given joined pair will not occur to an appreciable extent because of variations in "drawdown." Since wire pair 22, which is eventually separated in forming the present configuration, remains joined during manufacture until just prior to the twisting operation, the advantage of a joined pair with respect to "drawdown" is also preserved.

Although web-joined pairs may be used for both the joined pair 8 and the later separated pair 22, it should be understood that other forms of joined wire can be used. For example, the tangentially joined wire pair shown in U.S. Patent No. 3,102,160, assigned to the assignee of the present invention, may be substituted for the webbed wire pair 22 that is to be separated.

Further, where the minimal resistance unbalance afforded by the use of two joined wire pairs is not required, two separate wires may be used in place of one joined pair, and the slitting operation eliminated. The configuration resulting from the combination of one joined wire pair and two separate wires will be substantially identical to that resulting from the use of two joined pairs and illustrated in FIGURES 1 and 3.

The dimensions of the joined wire pair can be adjusted to obtain desired electrical and mechanical characteristics in our quad cable. Mutual capacitance between wires of a pair may be controlled by changes in web width and/or the thickness of the primary insulation layer to change the interaxial spacing of the wires. The web thickness can be adjusted to a desired degree of flexibility, thus allowing some control over the amount of air entrapped between the wire pairs. As disclosed in copending application, Ser. No. 511,372, filed December 3, 1965, assigned to the assignee of the present application, the mutual capacitance of a cable can be markedly affected thereby, and cable size can be reduced because less primary insulation is required for the wires.

As best seen in FIGURE 1, the interaxial spacing of the conductors, i.e., the distance between the conductor centers of a pair will be determined by the width of the web 16 and the overall wire diameter (DOD). Thus the conductors 10, 12, 25, and 27 may have diameters of 0.0253 inch covered with primary insulation having a wall thickness of about 0.006 inch. The integral web joining the insulated conductors may be flexible or rigid as desired. Where a flexible web is used, the inter-axial spacing of the joined pair is maintained by the reenforcing effect of the separate wires nested on either side of the web. A web thickness of from about 0.008 to about 0.010 inch with a web width of about 0.005 to 0.020 inch should be used. Accordingly, a given wire diameter (DOD) and desired interaxial spacing of the conductors will determine the web width. The interaxial spacing of the conductors 25 and 27 may differ from that of conductors 10 and 12 by shortening or lengthening the web and/or by varying the wire diameter.

Insulation materials such as polyethylene or polypropylene are preferred for the primary insulation and integral web, but other polymeric or elastomeric insulating materials may also be used. Since insulating materials vary in their dielectric properties, mutual capacitance between pairs will be affected by the insulation used.

As shown in FIGURE 7, an alternate embodiment of our quad cable employs a composite conductor for reducing cable weight and cost. The conductors 10a, 12a and 25a, 27a comprise a metal core 11 which is an electrical conductor, preferably of aluminum or aluminum alloy, which is sheathed with a layer 13 of copper. The primary insulation 14a, the web 16a and the insulation material for wire pair 24a, 26a, is the same as for the embodiment shown in FIGURE 1. With the use of an aluminum-copper composite conductor, the overall diameter of the conductors may be slightly increased, but the savings in weight and cost are generally more important considerations for field wire use. The cost of copper conductors comprise more than half the cost of the quad cable and the use of an aluminum core sheathed with copper substantially reduces the overall cost of the cable. Thus, the embodiment shown in FIGURE 7 may be used in any application where the FIGURE 1 embodiment would be used and where wire diameter would not be considered critical.

While the present invention is particularly suitable for field communication quad cable as shown in FIGURE 3, it is not limited thereto. FIGURE 4 illustrates a jacketed communication cable 34 comprising a core 36 composed of a plurality of the quad cable 32. The separate quads 32 are bundled together and twisted as shown in FIGURE 4, or bundled together without twisting to form the core 36. As known in the art, the core is enclosed in an outer protective covering 34 which can comprise a single layer as shown or multiple layers of insulation and/or shielding as required.

Where a number of wire pairs are incorporated into a cable core, the use of our quad cable as a component of a larger multi-pair cable also facilitates pair identification. Since each quad remains intact in the core, the group can be easily located and isolated from other such quads for attachment of the color-coded wires to terminals, or for a tap-in connection. In addition, such a jacketed cable formed of a plurality of quads incorporates the advantages of the individual quads as discussed above.

The joined pairs 8 and 22 are formed by extrusion and contrasting color stripes 9 and 29 may be in or on the insulation of the pairs 8 and 22, respectively, for color-coding purposes. Thus a quad cable and the wires as shown in FIGURE 1 will have ready identification. The color of stripes 9 and 29 and the color of the primary insulation may all be contrasting for a variety of identifying combinations. The joined pair 8 can always be readily identified as distinct from the separated pair 24, 26. To further aid in the color-coding of quads when a plurality of quads forms a cable core as shown in FIGURE 4, the color-coding stripes may be of varying widths or may even surround the circumference of one or more of the wires of the quad. Thus a great variety of color-coding combinations is possible to identify the quads and the wires in each quad.

It will thus be seen that the objects set forth above, among those made apparent from the preceding description, are efficiently attained and, since certain changes may be made in carrying out the above method and in the article set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described our invention, what we claim as new and desire to secure by Letters Patent is:

1. The method of making a quad cable for communication use from joined wire pairs comprising:
   A. continuously feeding a first joined wire pair comprising
   (1) two spaced electrical conductors,
   (2) surrounded by electrical insulation, and
   (3) joined by an integral web of said electrical insulation;

B. continuously feeding a second joined wire pair toward said first joined wire pair;
C. continuously separating said second joined wire pair to form two separate wires; and
D. then continuously nesting said two separate wires on said first wire pair in juxtaposition to one another along and across said web of said first wire pair.

2. The method as defined in claim 1 wherein said first joined wire pair and said separate wires are entwined by twisting said quad cable about its longitudinal axis.

3. The method as defined in claim 1 wherein said separate wires are nested along and across said web at a point adjacent the point where separation of said second joined wire pair occurs.

4. A quad cable for communication use characterized by minimal resistance unbalance and made by the method comprising:
A. continuously feeding a first joined wire pair comprising
  (1) two spaced electrical conductors,
  (2) surrounded by electrical insulation, and
  (3) joined by an integral web of said electrical insulation;
B. continuously feeding a second joined wire pair toward said first joined wire pair;
C. continuously separating said second joined wire pair to form two separate wires; and
D. then continuously nesting said two separate wires on said first wire pair in juxtaposition to one another along and across said web of said first wire pair.

5. A quad cable as defined in claim 4 wherein said separate wires are nested along and across said web at a point adjacent the point where separation of said second joined wire pair occurs.

6. A quad cable as defined in claim 4 wherein said separate wires are spaced from said web to provide air space between said wires in the cable.

7. A quad cable as defined in claim 4 wherein said first joined wire pair and said separate wires are entwined by twisting said quad cable about its longitudinal axis.

References Cited

UNITED STATES PATENTS

| 3,102,160 | 8/1963 | Cook et al. | 174—112 |
| 3,361,871 | 1/1968 | Brandt | 174—112 |

FOREIGN PATENTS 187,627  2/1964  Sweden.

JOHN PETRAKES, *Primary Examiner.*

Disclaimer 3,406,514.—*George Andrew Hanlon*, Branford, and *Albert James Garde*, Milford, Conn. COMMUNICATION CABLE QUAD AND METHOD OF MAKING SAME. Patent dated Oct. 22, 1968. Disclaimer filed Nov. 20, 1968, by the assignee, *The Whitney Blake Company*.

Hereby disclaims the terminal portion of the term of the patent subsequent to Jan. 16, 1985.

[*Official Gazette December 24, 1968.*]